US 9,739,586 B2

(12) United States Patent
Whalen (10) Patent No.: US 9,739,586 B2
(45) Date of Patent: Aug. 22, 2017

(54) METHOD AND APPARATUS FOR DETERMINING SAFETY OF A WORKING ENVIRONMENT

(71) Applicant: Alberta British Columbia Safety Inc., Edmonton (CA)

(72) Inventor: David George Whalen, Delta (CA)

(73) Assignee: Alberta British Columbia Safety Inc., Edmonton (CA)

( * ) Notice: Subject to any disclaimer, the term of this patent is extended or adjusted under 35 U.S.C. 154(b) by 99 days.

(21) Appl. No.: 14/548,918

(22) Filed: Nov. 20, 2014

(65) Prior Publication Data

US 2015/0144423 A1 May 28, 2015

Related U.S. Application Data

(60) Provisional application No. 61/907,792, filed on Nov. 22, 2013.

(51) Int. Cl.
*G01B 3/04* (2006.01)

(52) U.S. Cl.
CPC ..................... *G01B 3/04* (2013.01)

(58) Field of Classification Search
CPC ... G01B 3/04; A62B 35/0006; A62B 35/0075; A62B 35/04; E06C 7/003; E06C 9/14
See application file for complete search history.

(56) References Cited

U.S. PATENT DOCUMENTS 2,214,091 A * 9/1940 Turquand ............... B41J 29/42
33/486

2,380,318 A * 7/1945 Kline ..................... G06C 3/00
235/85 R (Continued)

FOREIGN PATENT DOCUMENTS

CA 2871883 A1 * 5/2015 ............... G06C 3/00
FR 2974305 A1 * 10/2012 ............. A62B 35/04

(Continued)

OTHER PUBLICATIONS

CSA International, Fall-Arrest Systems—Practical Essentials, Jan. 2000, p. 109.

(Continued)

*Primary Examiner* — Katherine Mitchell
*Assistant Examiner* — Candace L Bradford
(74) *Attorney, Agent, or Firm* — Michael R. Schacht; Schacht Law Office, Inc.

(57) ABSTRACT

An apparatus for determining the safety of a working environment comprising a panel assembly including first D-Ring indicia corresponding to D-Ring height, a first slider supported for movement relative to the panel assembly, the first slider including first anchor height indicia corresponding to anchor height and a Free Fall Distance (FFD) indexing arrow, a second slider supported for movement relative to the panel assembly, the second slider including FFD indicia corresponding to FFD first lanyard length indicia corresponding to lanyard length. The first slider is moved to a first slider FFD calculation position based on a determined anchor height. The second slider is moved to a second slider FFD calculation position based on a determined lanyard length and a determined D-Ring height. The FFD is determined based on a relative position of the FFD indexing arrow on the first slider and the FFD indicia on the second slider.

11 Claims, 11 Drawing Sheets

(56) References Cited

U.S. PATENT DOCUMENTS

| | | | | | |
|---|---|---|---|---|---|
| 2,445,464 | A | * | 7/1948 | Ailinger | G06G 1/04 235/70 R |
| 3,352,031 | A | * | 11/1967 | Lindquist | G09B 23/02 235/85 R |
| 3,627,199 | A | * | 12/1971 | Hill | G06G 1/0026 235/65 |
| 3,908,112 | A | * | 9/1975 | Lo | G06G 1/0042 235/61 B |
| 4,124,795 | A | * | 11/1978 | LiCalsi | G06G 1/0005 235/70 A |
| 4,241,867 | A | * | 12/1980 | Wolf | G06G 1/06 235/85 R |
| 4,554,994 | A | * | 11/1985 | Weiner | E06C 7/003 116/307 |
| 6,196,455 | B1 | * | 3/2001 | Robinson | G06G 1/0057 235/70 A |
| 7,806,695 | B1 | * | 10/2010 | George | G09B 19/00 434/236 |
| 8,584,944 | B2 | * | 11/2013 | White | G06G 1/0057 235/380 |
| 2015/0144423 | A1 | * | 5/2015 | Whalen | G01B 3/04 182/3 |

FOREIGN PATENT DOCUMENTS

| | | | | |
|---|---|---|---|---|
| WO | WO 2009006674 | A1 * | 1/2009 | A63B 71/0672 |
| WO | WO 2012021563 | A2 * | 2/2012 | A62B 35/0068 |

OTHER PUBLICATIONS

Honeywell, Website http://www.millerfallprotection.com/fallclearance/showlanyard.php?metric, Calculator after calculation, 1 page.

Honeywell, Website https://www.millerfallprotection.com/#lanyard0, Calculator pre-calculate, 1 page.

Oil Sands Safety Association, OSSA Fall Protection Safety Training Standard, Jan. 14, 2013, pp. 17-19, FP2010-Rev01.

* cited by examiner

METHOD AND APPARATUS FOR DETERMINING SAFETY OF A WORKING ENVIRONMENT

RELATED APPLICATION

This application claims benefit of U.S. Provisional Application Ser. No. 61/907,792 filed Nov. 22, 2013, which is incorporated by reference herein in its entirety.

TECHNICAL FIELD

The present invention relates to fall protection equipment and devices. In particular, the invention relates to a device for establishing a Free Fall Distance (FFD) and Clearance Required (CR) for workers working at height by utilizing user input of measurements from a worker's personal protective equipment (PPE) (e.g., lanyard length) and certain work site conditions (e.g., anchor tie off height).

BACKGROUND

Workers that work at heights where there is a risk of injury from falling are required by law (Occupational Health and Safety Legislation) to calculate their Free Fall Distance (FFD) and Clearance Required (CR), and keep them within safe parameters. There is a long series of mathematical calculations necessary to determine the FFD and CR depending on the equipment the workers are using and their work site configuration. Workers in these situations often have limited education and mathematical skills, which make it challenging for them to accurately calculate the FFD and CR, as required by law.

There are website applications available online that will permit a worker to calculate FFD and CR. However, the equipment required to use these applications (e.g., computers, tablets or mobile telephones) is not intrinsically safe and is often unfeasible or prohibited from worksites.

Figure 10:
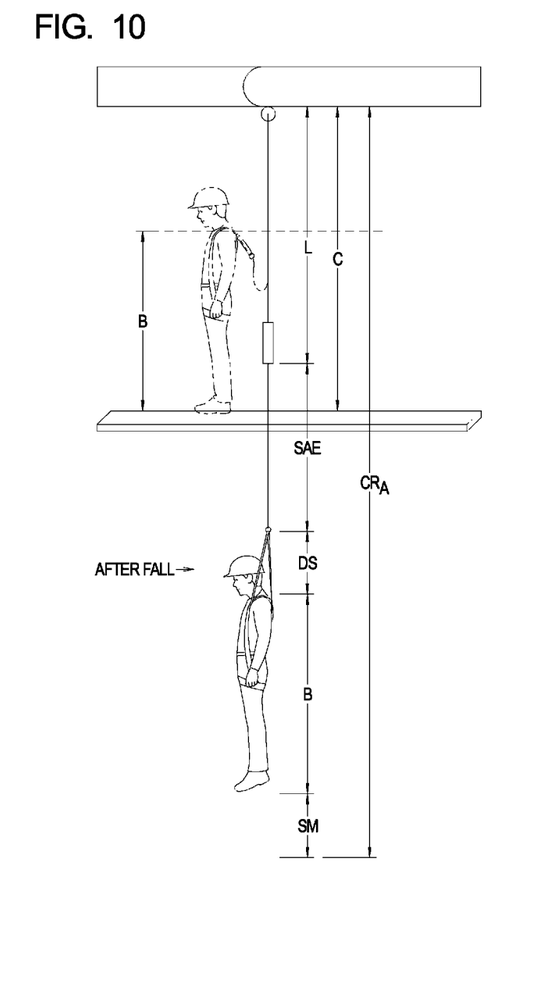
FIG. 10 is a schematic view which diagrammatically depicts certain parameters used in determining Free Fall Distance and Clearance Required, along with defining certain terms.

Table 1 is a list of acronyms that are used in industry to determine FFD and CR. FIG. 10 is an illustration which assists in the understanding of the terms in the following TABLE 1.

TABLE 1

| Acronym | Description |
|---|---|
| L | Length of lanyard, shock absorber & connecting hardware (initial overall length) |
| B | Distance from the feet to the harness D-Ring (Standing worker) |
| C | Distance from the feet to the anchorage level (Standing worker) |
| SAE | Shock Absorber Extension |
| DS | D-ring Slippage (typically 1 ft or 0.3 m) |
| SM | Safety Margin between bottom of feet and level below (typically 2 ft (0.6 m) or 3 ft (0.9 m)) |
| FFD | Free Fall Distance = L + B − C |
| TFD | Total Fall Distance = FFD + DS + SAE |
| CR | Clearance Required |
| $CR_A$ | Clearance Required from the Anchor = TFD + SM + C |

Exposure to arrest forces that exceed safe limits can lead to injuries, such as: ruptured intestines, fractured liver, traumatic abdominal organ displacement into the chest cavity, and or fractures and tears to the extremities. Workers utilizing fall protection equipment must ensure that if they fall, the arrest forces imposed on their bodies during fall arrest are kept within safe limits. These arrest forces are determined in part by their FFD. As the free fall distance increases, so does the impact force on their bodies, anchor or anchorage, and all system components which could fail if forces are exceeded.

Free fall distance (FFD) is defined as the vertical distance from the onset of a fall to the point where the fall-arrest system begins to apply force to arrest the fall. To calculate the FFD, the length of lanyard, shock absorber and connecting hardware (L) is added to the distance from the worker's feet to the harness D-Ring (B), which is subtracted from the distance between the working level and anchor height (C). The formula may be stated as Free Fall Distance=Length of lanyard+D-Ring Height−Anchor Height and may be stated as follows:

$$\text{FFD}=L+B-C \tag{1}$$

Total fall distance (TFD) is defined as the maximum distance fallen by the worker using a fall-arrest system between the onset of a fall and the instant when the worker first achieves zero vertical velocity. Total-fall distance is often determined as the displacement of the dorsal D-Ring on the full-body harness and is the sum of the free fall and the deceleration distance. It also includes any applicable swing-fall distance. It is essentially the vertical distance from the point at which a worker falls to the point where the fall stops (that is, after all fall arresting system components have extended).

To calculate the TFD, the Free Fall Distance (FFD) is added to the D-Ring Slippage (DS) and the extension of the shock absorber (SAE). The maximum shock absorber extension (as indicated on the unit) must be used when determining the total fall distance. The formula may be stated as Total Fall Distance=Free Fall Distance+D-Ring Slippage+Shock Absorber Extension and may be written as follows:

$$\text{TFD}=\text{FFD}+\text{DS}+\text{SAE} \tag{2}$$

CSA Standard Z259.16-04 Design of Active Fall Protection Systems defines clearance as: "the distance from a specified reference point, such as the working platform or anchorage of a fall-arrest system, to the highest obstruction that a worker might encounter during a fall."

Minimum fall clearance (CR) from the Anchor is the total fall distance (TFD) plus a safety margin (SM) of at least 0.6 m (2 ft) plus Anchor height. The formula may thus be written as follows:

$$CR_A=\text{TFD}+\text{SM}+C \tag{3}$$

In summary, without the present invention, the worker must remember the following formulas (in bold) and complete calculations (like the example calculations shown below), which leave room for error and may lead to worker injury if miscalculated:

$$\text{FFD}=L+B-C \tag{1}$$

$$\text{FFD}=6+5-7$$

$$\text{FFD}=4$$

$$\text{TFD}=\text{FFD}+\text{DS}+\text{SAE} \tag{2}$$

$$\text{TFD}=4+1+4$$

$$\text{TFD}=9$$

$$CR_A=\text{TFD}+\text{SM}+C \tag{3}$$

$$CR_A=9+2+7$$

$$CR_A=18$$

It would be beneficial if a system was developed which did not require a worker to remember the aforementioned formulas or perform calculations similar to those shown above, so as to reduce errors and worker injuries.

SUMMARY

The present invention is designed to address at least one of the aforementioned problems and/or meet at least one of the aforementioned needs.

A method and apparatus for determining Free Fall Distance (FFD) and Clearance Required (CR) is disclosed. The apparatus is in the form of a slide rule that includes first and second sliders that move within a front and back of the slide rule. The front of the first slider includes indicia corresponding to anchor height, while the front of the second slider includes indicia corresponding to lanyard length and FFD. By moving the sliders such that appropriate indicia are placed within corresponding windows on the front of the slide rule, the FFD may be determined without performing any mathematical calculations.

Similarly, the back of the first slider includes indicia corresponding to shock absorber extension values, while the back of the second slider includes indicia corresponding to lanyard length and CR. By moving the sliders such that appropriate indicia are placed within corresponding windows on the back of the slide rule, CR may be determined without performing any mathematical calculations.

The present invention may thus be embodied as a method for determining the safety of a working environment comprising the following steps. A panel assembly including first D-Ring indicia corresponding to D-Ring height is provided. A first slider for movement is arranged relative to the panel assembly. The first slider includes first anchor height indicia corresponding to anchor height and a Free Fall Distance (FFD) indexing arrow. A second slider is arranged for movement relative to the panel assembly. The second slider includes FFD indicia corresponding to FFD and first lanyard length indicia corresponding to lanyard length. The first slider is moved to a first slider FFD calculation position based on a determined anchor height. The second slider is moved to a second slider FFD calculation position based on a determined lanyard length and a determined D-Ring height. The FFD is determined based on a relative position of the FFD indexing arrow on the first slider and the FFD indicia on the second slider.

The present invention may also be embodied as an apparatus for determining the safety of a working environment comprising a panel assembly, a first slider, and a second slider. The panel assembly includes first D-Ring indicia corresponding to D-Ring height. The first slider is supported for movement relative to the panel assembly and includes first anchor height indicia corresponding to anchor height and a Free Fall Distance (FFD) indexing arrow. The second slider is supported for movement relative to the panel assembly and includes FFD indicia corresponding to FFD and first lanyard length indicia corresponding to lanyard length. The first slider is moved to a first slider FFD calculation position based on a determined anchor height. The second slider is moved to a second slider FFD calculation position based on a determined lanyard length and a determined D-Ring height. The FFD is determined based on a relative position of the FFD indexing arrow on the first slider and the FFD indicia on the second slider.

The present invention may also be embodied as apparatus for determining the safety of a working environment comprising a panel assembly, a first slider, and a second slider. The panel assembly includes numerical indicia corresponding to D-Ring height. The first slider supported for movement relative to the panel assembly and includes numerical indicia corresponding to shock absorber extension and a $CR_A$ indexing arrow. The second slider is supported for movement relative to the panel assembly and includes numerical indicia corresponding to $CR_A$ and numerical indicia corresponding to lanyard length. The first slider is moved to a first slide $CR_A$ calculation position based on a determined shock absorber extension. The second slider is moved to a second slide $CR_A$ calculation position relative to the panel assembly based on a determined lanyard length and a determined D-Ring height. The $CR_A$ is determined based on a relative position of the $CR_A$ indexing arrow on the first slider and the numerical indicia corresponding to $CR_A$ on the second slider.

Other objects, features, embodiments and advantages of the invention will be apparent from the following specification taken in conjunction with the following drawings.

DETAILED DESCRIPTION

While this invention is susceptible of embodiments in many different forms, there is shown in the drawings and will herein be described in detail, several embodiments of the invention with the understanding that the present disclosure is to be considered as an exemplification of the principles of the invention and is not intended to limit the broad aspects of the invention to the embodiments illustrated.

Figure 1:
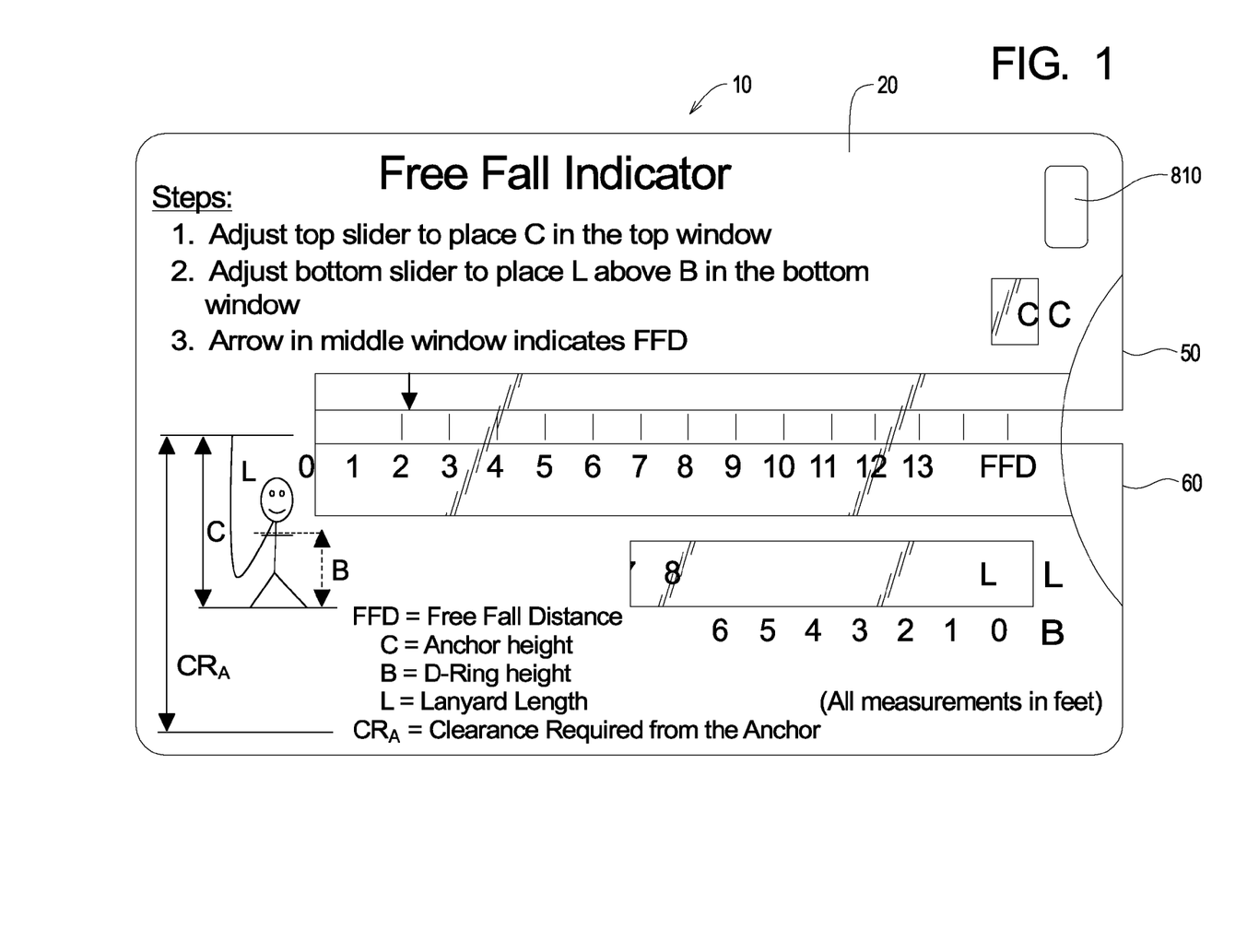
FIG. 1 is a front view of an exemplary slide rule accordance with one embodiment of the present invention.
Figure 2:
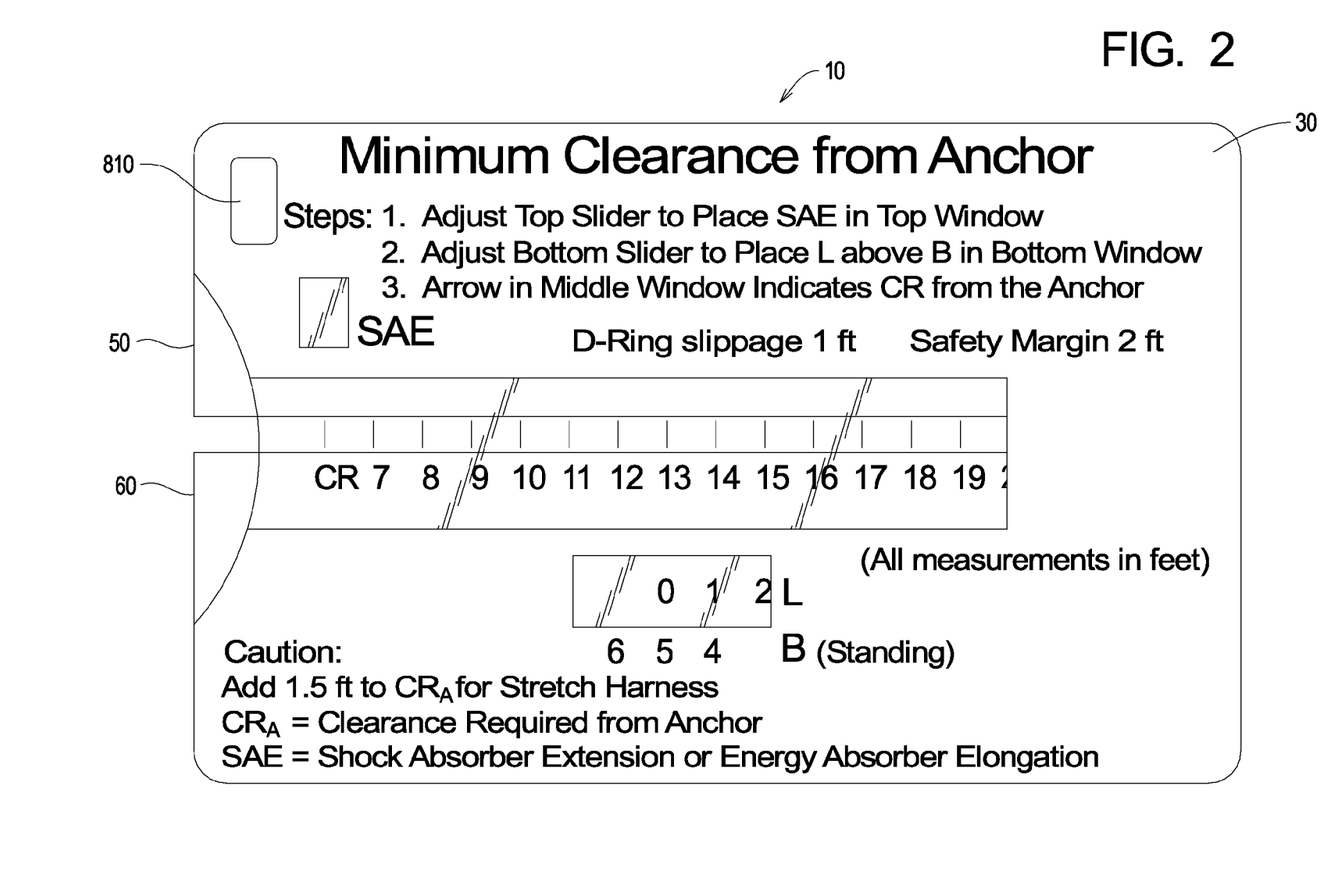
FIG. 2 is a rear view of the slide rule of FIG. 1.

With reference to FIGS. 1 and 2, a slide rule 10 for determining Free Fall Distance (FFD) and Clearance Required (CR) is shown. Specifically, FIG. 1 illustrates a front view of the slide rule 10, while FIG. 2 is a rear view of the slide rule 10.

Figure 3A:
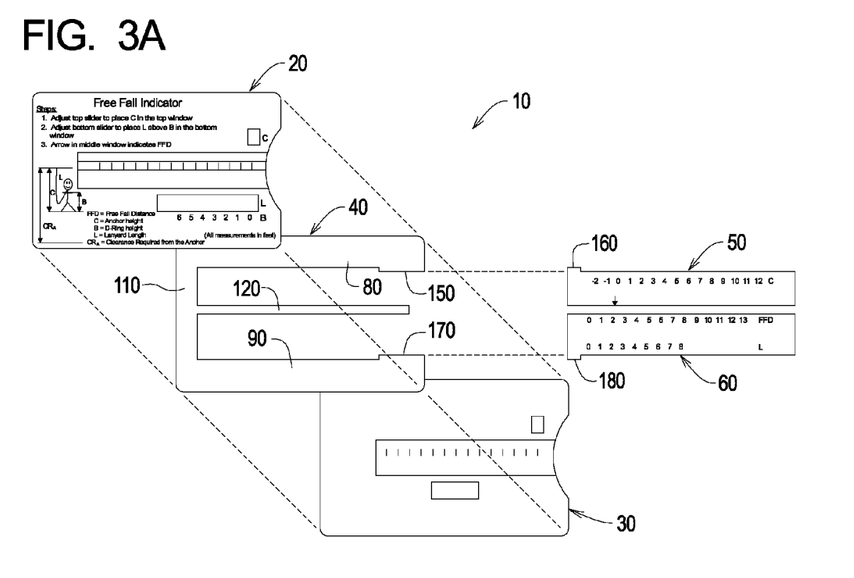
FIG. 3A is an exploded view of the front of the slide rule of FIG. 1.
Figure 3B:
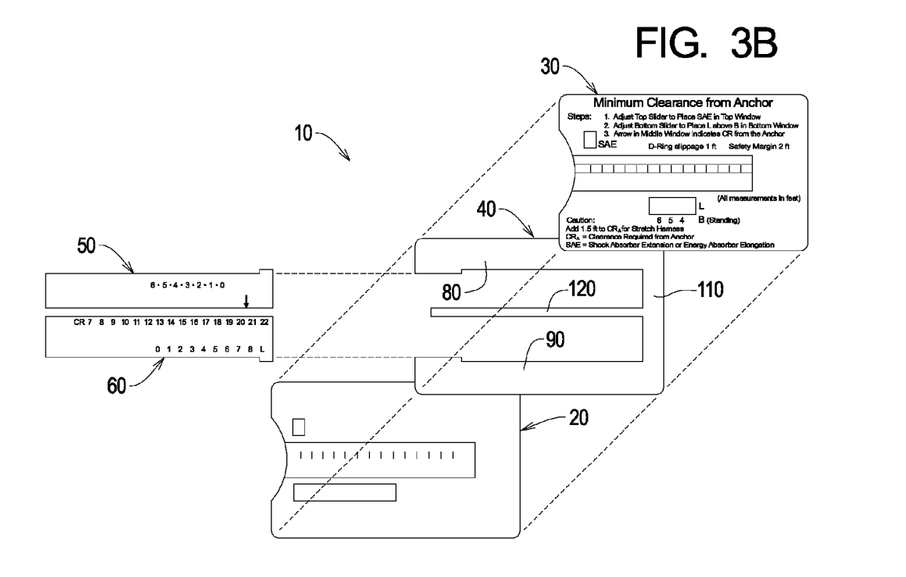
FIG. 3B is an exploded view of the back of the slide rule of FIG. 1.

FIGS. 3A and 3B are exploded front and rear views, respectively, of the slide rule 10. As shown in FIGS. 3A and 3B, the slide rule 10 has five main components, namely, a first (front) panel 20, a second (back) panel 30, a third (center) panel 40, a first (upper/top) slider 50 and a second (lower/bottom) slider 60.

Figure 4:
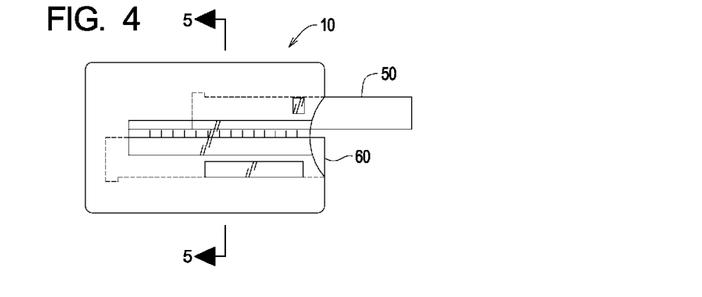
FIG. 4 is a schematic view of the front of the slide rule of FIG. 1, which shows a first slider that has been moved from its initial position and a second slider that is in its initial position.
Figure 5:
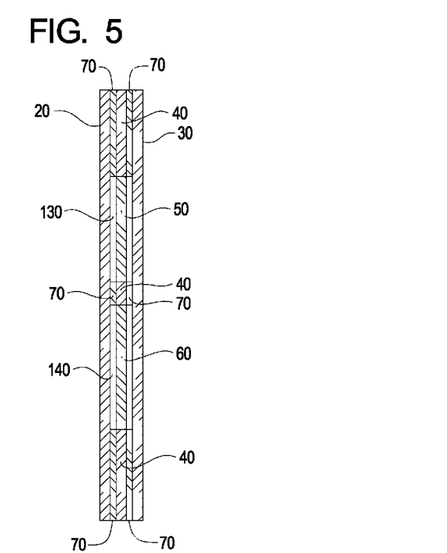
FIG. 5 is a schematic cross-sectional view taken along line 5-5 of FIG. 4.

As shown in FIG. 4, which is a schematic front view of the slide rule 10, the device 10 is constructed, such that the first and second sliders 50, 60 are moveable relative to the front, back and center panels 20, 30, 40, all of which are fixed relative to one another. FIG. 5, which is a cross-sectional view taken along line 5-5 of FIG. 4, shows that adhesive 70 is used to attach the front panel 20 and the center panel 40 to each other. Similarly, FIG. 5 shows that adhesive 70 is used to attach the rear panel 30 and the center panel 40 to each other.

With reference again to FIGS. 3A and 3B, the center panel 40 is generally U-shaped and has a first (upper) leg 80, a second (lower) leg 90, a base 110 connecting the first and second legs 80, 90, and a central member 120. As will be understood with reference to FIGS. 3A, 3B, 4 and 5, adhesive 70 is applied between the front panel 20 and center panel 40 and between the rear panel 20 and the center panel 40, so as to create first and second elongated slots 130, 140 (exaggerated in size in FIG. 5), in which first and second sliders 50, 60, respectively, move. Accordingly, in one embodiment, adhesive is applied in a configuration that essentially matches the shape of the central panel 40 (both front and back).

As shown in FIGS. 3A and 3B, in order to retain the first slider 50 in first slot 130, the first leg 80 of the center panel 40 includes an extension 150 that cooperates with a tab 160 of the first slider 50. Similarly, in order to retain the second slider 60 in second slot 140, the second leg 90 of the center panel 40 includes an extension 170 that cooperates with a tab 180 of the second slider 60. Because the first and second sliders 50, 60 are designed to be retained within the first and second slots 130, 140, in one embodiment, they are placed at an appropriate location during construction of the device, as they normally cannot be inserted into their respective slots after the front panel 20, back panel 30 and central panel 40 have become fixed relative to one another.

In one embodiment, the front panel 20, back panel 30, center panel 40, first slider 50 and second slider 60 are each made of plastic and are flexible. In one embodiment, the center panel 40 is white plastic with no printing thereon. In one embodiment, the first and second sliders 50, 60 are made of white plastic with indicia printed thereon (to be described in further detail in connection with FIGS. 6B and 7B). In one embodiment, the front and back panels 20, 30 are made of clear plastic with white coloring and indicia printed on portions thereof, such that certain areas (portions not colored with white) form windows (to be described in further detail in connection with FIGS. 6A and 7A).

Figure 6A:
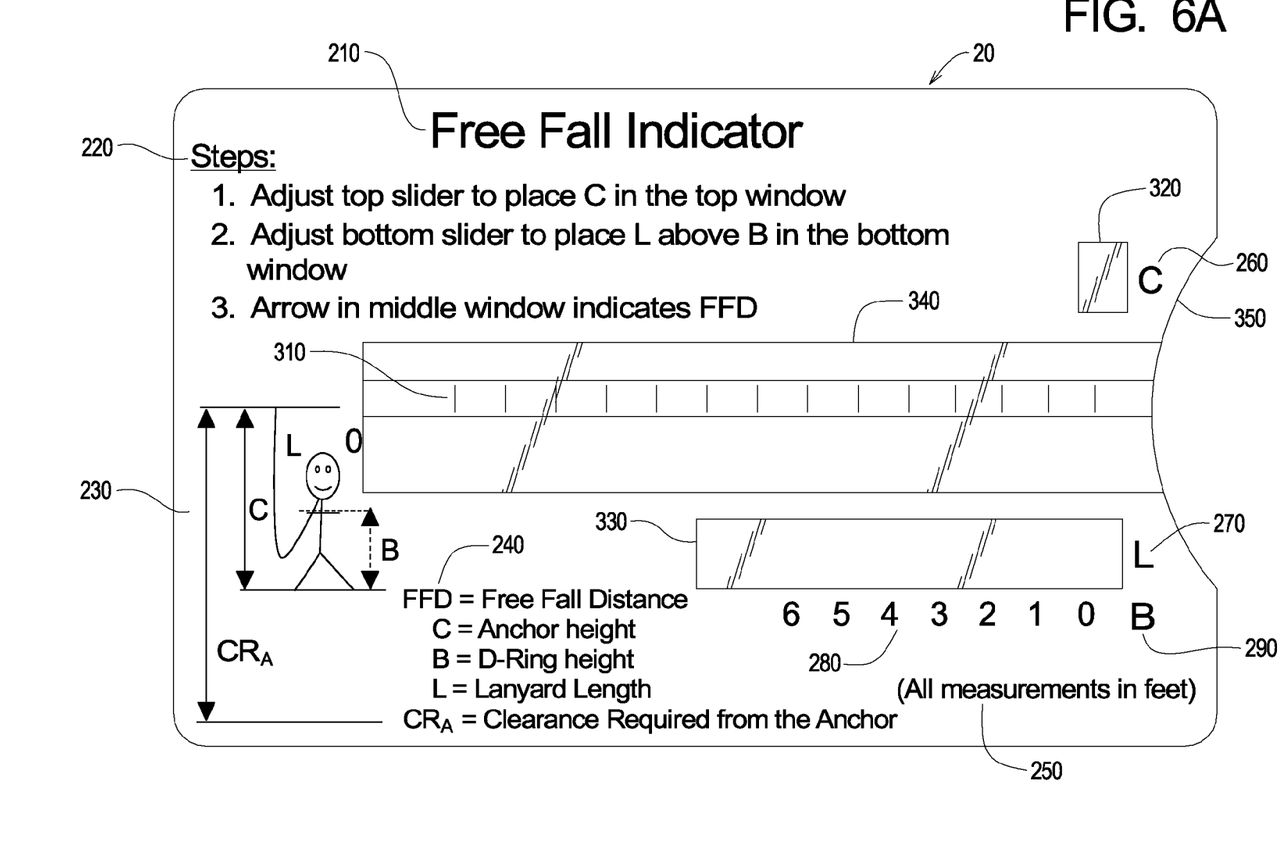
FIG. 6A is a plan view of the front panel of the device of FIG. 1.

Reference is now made to FIG. 6A, which is a plan view of the front panel 20 of the slider 10 of FIG. 1. The front panel 20 includes indicia thereon, including title indicia 210, operational indicia 220 (for free fall distance determination), diagrammatic indicia 230, legend indicia 240, units indicia 250, anchor height window identifier 260, lanyard length window identifier 270, numerical indicia corresponding to D-Ring height 280, D-Ring height indicia indicator 290 and index indicia 310 (vertical lines). The front panel also includes windows, including anchor height (top) window 320, lanyard length (bottom) window 330 and main (middle) window 340. The front panel 20 is generally rectangular with rounded corners and includes an arcuate notch 350 to permit a user to access ends of first and second sliders 50, 60 (see FIG. 1).

In one embodiment, the index indicia are printed on the inside of the main window 340 (back of the front panel), as shown in FIG. 3B. It should be noted that the horizontal lines in the main window 340 are not necessarily present, but are provided in FIGS. 3A and 6A to demonstrate the approximate lowermost position of the first slider 50 (in the case of the upper horizontal line) and the approximate uppermost position of the second slider 60 (in the case of the lower horizontal line).

Figure 6B:
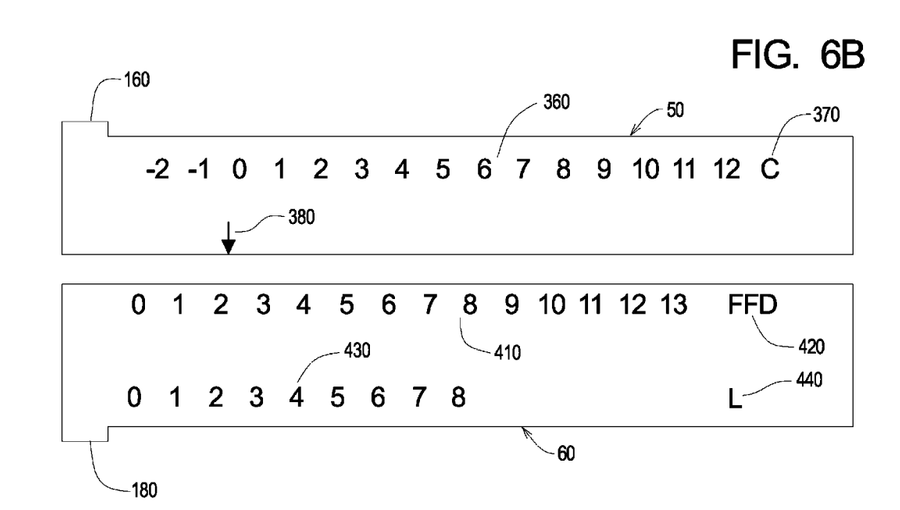
FIG. 6B is a plan view of the front of the first and second sliders of FIG. 1.

FIG. 6B is a plan view of the front of the first and second sliders 50, 60. The front of the first slider 50 includes numerical indicia corresponding to anchor height 360, along with an anchor height identifier 370. In addition, the front of the first slider 50 includes an indexing arrow 380 (other shapes may be used) that cooperates with index indicia 310 of FIG. 6A (described and shown infra). As shown in FIG. 6B, the indexing arrow 380 is aligned under the center of the numerical indicia corresponding to an anchor height 360 of 0. The numerical indicia corresponding to the anchor height 360 have a center-to-center spacing that corresponds to the spacing between adjacent index indicia 310 (see FIG. 6A).

As shown in FIG. 6B, the front of the second slider 60 includes numerical indicia corresponding to free fall distance 410, along with a free fall distance identifier 420. The front of the second slider also includes numerical indicia corresponding to lanyard length 430, along with a lanyard length identifier 440. The numerical indicia corresponding to free fall distance 410 and the numerical indicia corresponding to lanyard length 430 have a center-to-center spacing that corresponds to the spacing between adjacent index indicia 310 (see FIG. 6A). Furthermore, to the extent that the numerical indicia corresponding to free fall distance 410 and the numerical indicia corresponding to lanyard length have equal numerical values, such values are vertically aligned with one another. In addition, the numerical indicia corresponding to the free fall distance 410 cooperates with the index indicia 310 and indexing arrow 380 (other shape may be used) to enable a user to determine a free fall distance (shown and described infra).

Figure 7A:
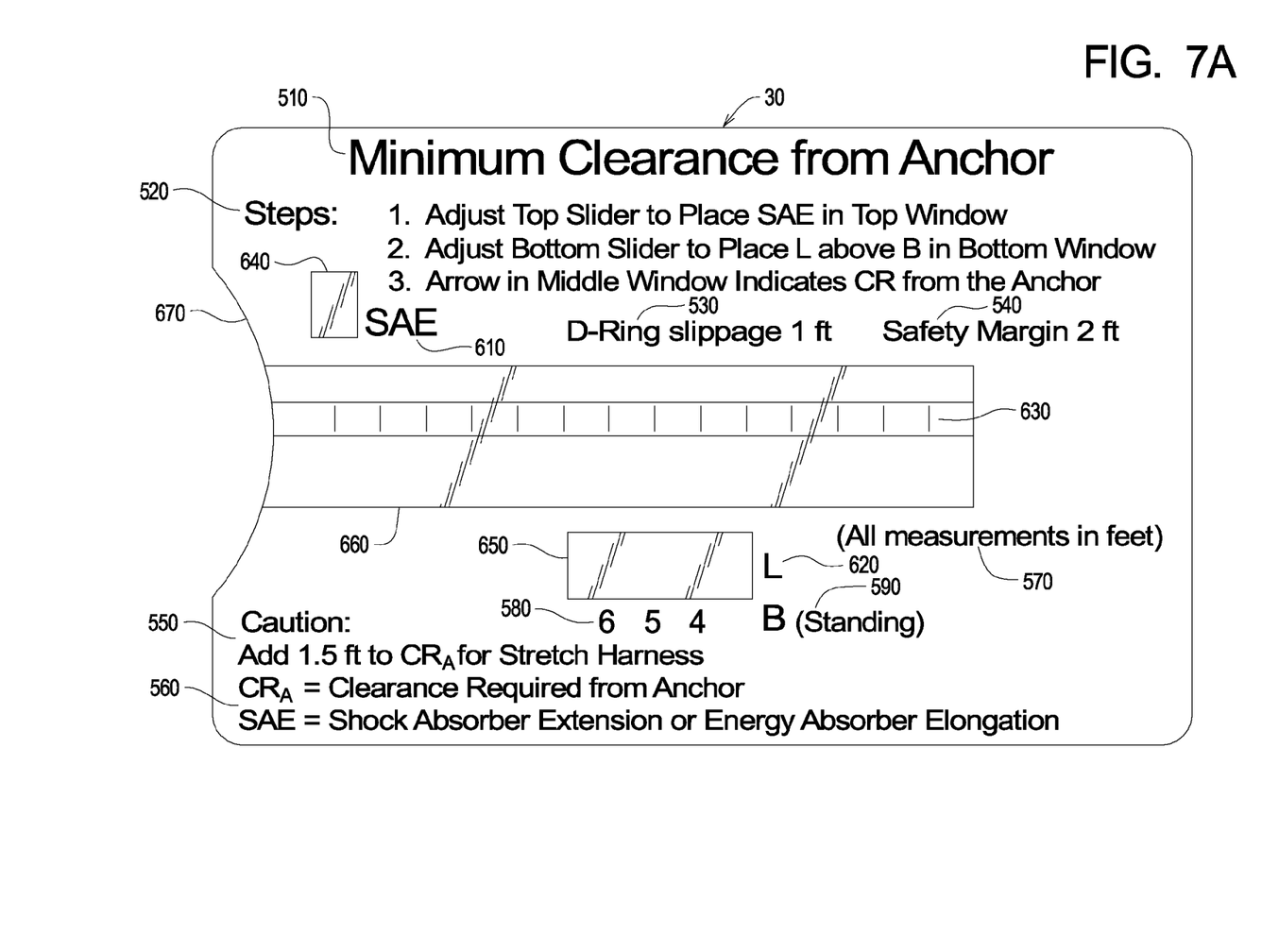
FIG. 7A is a plan view of the back panel of the device of FIG. 1.

Reference is now made to FIG. 7A, which is a plan view of the back panel 30 of the slider 10 of FIG. 1. The back panel 30 includes indicia thereon, including title indicia 510, operational indicia 520 (for clearance required determination), D-Ring slippage indicia 530, Safety Margin indicia 540, cautionary indicia for Stretch Harness 550, legend indicia 560 (for $CR_A$ and SAE), units indicia 570, numerical indicia corresponding to D-Ring height 580, D-Ring height indicia indicator 590, shock absorber extension window identifier 610, lanyard length window identifier 620 and index indicia 630 (vertical lines). The back panel 30 also includes windows, including shock absorber extension (top) window 640, lanyard length (bottom) window 650 and main (middle) window 660. The back panel 30 is generally rectangular with rounded corners and includes an arcuate notch 670 to permit a user to access ends of first and second sliders 50, 60 (see FIG. 2).

In one embodiment, the index indicia are printed on the inside of the main window 660 (back of the back panel), as shown in FIG. 3A. It should be noted that the horizontal lines in the main window 660 are not necessarily present, but are provided in FIGS. 3B and 7A to demonstrate the approximate lowermost position of the first slider 50 (in the case of the upper horizontal line) and the approximate uppermost position of the second slider 60 (in the case of the lower horizontal line).

Figure 7B:
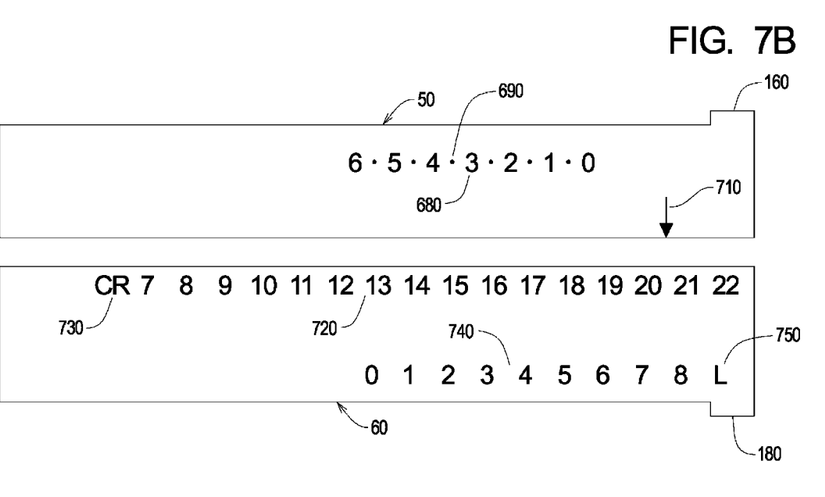
FIG. 7B is a plan view of the back of the first and second sliders of FIG. 1.

FIG. 7B is a plan view of the back of the first and second sliders 50, 60. The back of the first slider 50 includes numerical indicia corresponding to shock absorber extension values 680. In one embodiment (shown in FIG. 7B), non-numerical indicia 690 (in this case, dots) are placed between numerical indicia corresponding to shock absorber extension values. Such non-numerical indicia indicate half of the numerical increment between adjacent numerical indicia (e.g., 1.5, 2.5, 3.5, etc.). In addition, the back of the first slider 50 includes an indexing arrow 710 that cooperates with index indicia 630 of FIG. 7A (described and shown infra). As shown in FIG. 7B, the indexing arrow 710 is aligned under where the center of the numerical indicia corresponding to shock absorber extension values 680 of −2 would be. The numerical indicia corresponding to shock absorber extension values 680 have a center-to-center spacing that corresponds to the spacing between adjacent index indicia 630 (see FIG. 7A).

As shown in FIG. 7B, the back of the second slider 60 includes numerical indicia corresponding to clearance required 720, along with a clearance required identifier 730. The back of the second slider 60 also includes numerical indicia corresponding to lanyard length 740, along with a lanyard length identifier 750. The numerical indicia corresponding to clearance required 720 and the numerical indicia corresponding to lanyard length 740 have a center-to-center spacing that corresponds to the spacing between adjacent index indicia 630 (see FIG. 7A). Furthermore, to the numerical indicia corresponding to clearance required 720 having a value of 13 is vertically aligned with the numerical indicia corresponding to lanyard length 740 having a value of 0. In addition, the numerical indicia corresponding to clearance required 720 cooperates with the index indicia 630 and indexing arrow 710 to enable a user to determine clearance required (shown and described infra).

With reference to FIGS. 6A, 6B, 7A and 7B, in one embodiment, the color of the numerical indicia alternates (e.g., odd numbers red and even numbers black), so as to permit such indicia to be more easily read. In one embodiment, certain indicia are in a special color (e.g., red) to emphasize their importance. For example, references to $CR_A$ may be in a special color on the front panel 20 and/or back panel 30 of the slide rule 10.

Figure 8:
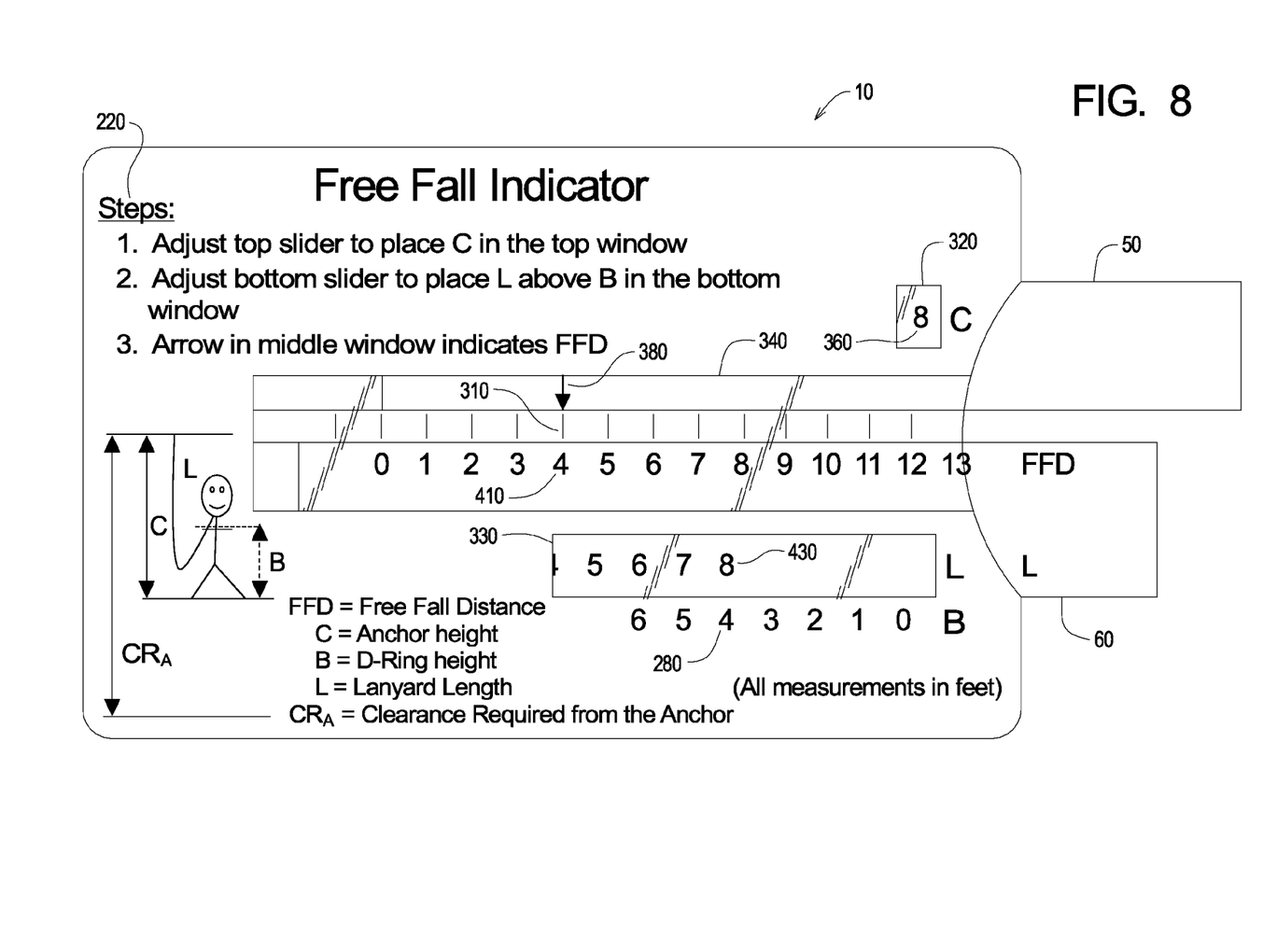
FIG. 8 is a front view of the slide rule of FIG. 1 showing the slide rule in use to determine Free Fall Distance.

FIG. 8 is a front view of the slide rule 10 being used to determine Free Fall Distance (FFD). The operational indicia 220 on the front of the slide rule 10 specify three steps. In this example, the worker is tying off at an anchor 8 feet above the working platform (C=8 feet), the D-Ring height at the worker's back measures 4 feet (B=4 feet), and the Lanyard Length is 8 feet (L=8 feet).

Accordingly, the first slider 50 is adjusted to place the numerical indicia corresponding to the anchor height 360 (here, C=8 feet) into the anchor height window 320. Next, the second slider 60 is adjusted to place the numerical indicia corresponding to the lanyard length 430 (here, L=8 feet) in the lanyard length window 330 above the numerical indicia corresponding to the D-Ring height 280 (here, B=4 feet).

Once the first two steps have been completed, the third step is to merely view the FFD, which is displayed in the main window 340. Specifically, the indexing arrow 380 points to index indicia 310 that is associated with the numerical indicia corresponding to FFD 410. In this case, the FFD reading on the slide rule 10 equals 4 feet, which is within safe limits.

Figure 9:
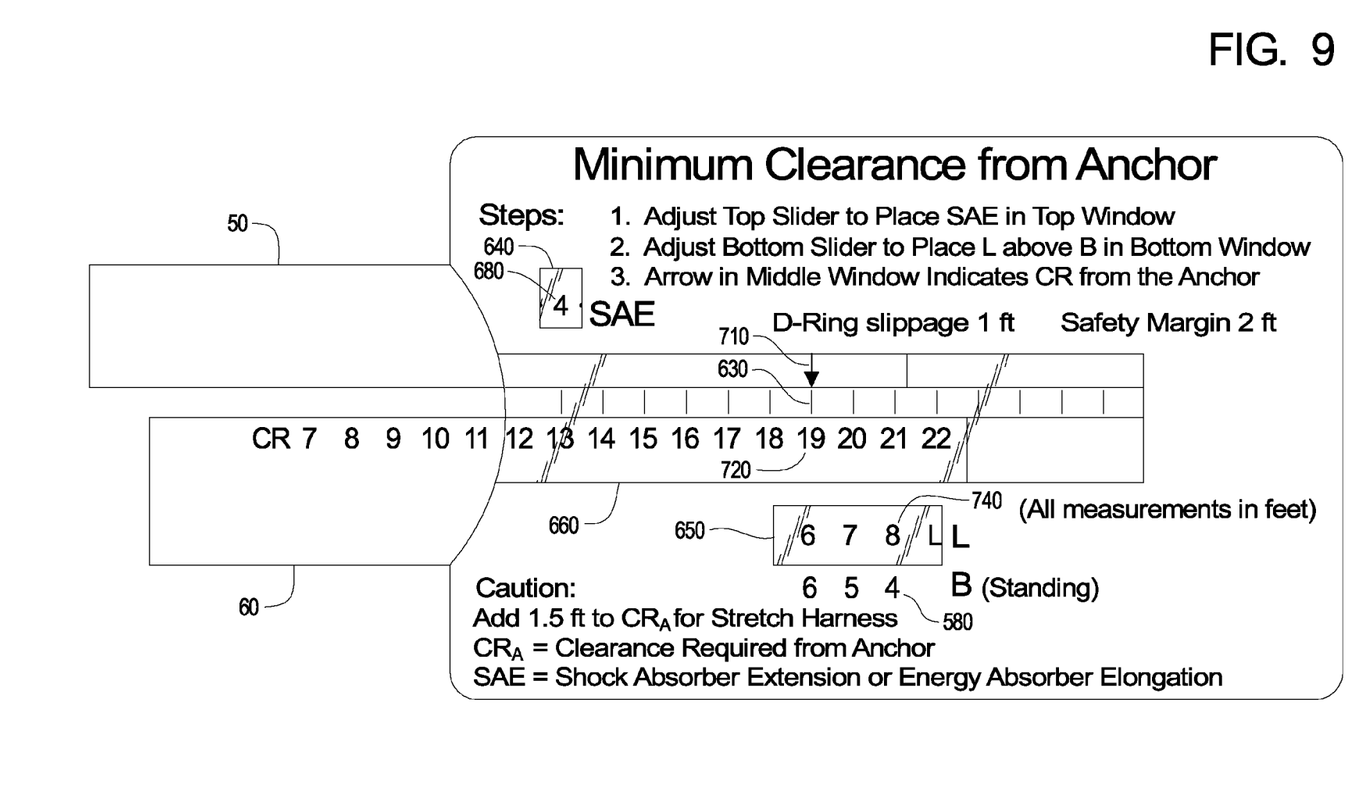
FIG. 9 is a rear view of the slide rule of FIG. 1 showing the slide rule in use to determine Clearance Required.

FIG. 9 is a rear view of the slide rule 10 being used to determine Clearance Required (CR). The operational indicia 520 on the back of the slide rule 10 specify three steps. In this example, the shock absorber extension (SAE) has a value of 4 feet (which is normally printed on the lanyard), the D-Ring height at the worker's back measures 4 feet (B=4 feet), and the Lanyard Length is 8 feet (L=8 feet).

Accordingly, the first slider 50 is adjusted to place the numerical indicia corresponding to the SAE 690 (here, SAE=4 feet) into the SAE window 640. Next, the second slider 60 is adjusted to place the numerical indicia corresponding to the lanyard length 740 (here, L=8 feet) in the lanyard length window 650 above the numerical indicia corresponding to the D-Ring height 580 (here, B=4 feet).

Once the first two steps have been completed, the third step is to merely view the CR, which is displayed in the main window 660. Specifically, the indexing arrow 710 points to index indicia 630 that is associated with the numerical indicia corresponding to CR 720. In this case, the CR reading on the slide rule 10 equals 19 feet. Therefore, the worker must ensure that he/she has 19 feet of clearance from the anchor point to any obstruction below.

In one embodiment, as shown in FIGS. 1 and 2, an aperture 810 is provided for clipping to belt, attachment to lanyard, or connection to a key ring (or the like). The aperture is only shown in FIGS. 1 and 2 for clarity. In one embodiment, the aperture may be formed using a punch after construction of the device. In one embodiment, each of the front panel 20, back panel 30 and center panel 40 has corresponding first, second and third apertures therein (not shown), which are aligned during construction of the device, so as to form the aperture 810.

It should be understood that the slide rule may be designed in many different ways with respect to number and types of sliders, along with scaling increments, but still serve the same function. In one embodiment, the slide rule may also be designed to measure clearance from the working platform or other reference points. In one embodiment, the scale units and values may be adjusted to meet different safety code requirements or special corporate needs. In one embodiment, the slide rule can be constructed to be pocket size and is not electrically powered, making it possible to be used in areas which require intrinsically safe equipment.

The device comprises a hand-held precision instrument with sliders from which calculation of FFD and CR is obtained based upon user input of lanyard or lifeline length (connecting component of personal fall protection system) in relation to the height of the D-Ring above the working platform, height of the tie off point (anchor) above the working platform, and the shock absorber extension (printed on the shock absorber). One or more of the values input by the user may be obtained by measurement or be listed on the user's personal protective equipment.

The device is lightweight and credit card sized and designed to be carried in a worker's wallet or pocket, hung on a lanyard, or affixed to a harness or other fall protection equipment. Workers use the sliders to indicate the length of their equipment and tie off height (anchor height) and the device provides them with the resulting FFD, which they are required by law to keep within specific parameters. The reverse side of the device also provides them with the minimum CR, which they are also required by law to calculate.

Several embodiments of the invention have been described. It should be understood that the concepts described in connection with one embodiment of the invention may be combined with the concepts described in connection with another embodiment (or other embodiments) of the invention.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An apparatus for determining the safety of a working environment comprising:
   a panel assembly including first D-Ring indicia corresponding to D-Ring height;
   a first slider supported for movement relative to the panel assembly, wherein the first slider includes
      first anchor height indicia corresponding to anchor height, and
      a free fall distance indexing arrow;
   a second slider supported for movement relative to the panel assembly, wherein the second slider includes
      free fall distance indicia corresponding to at least one free fall distance value, and
      first lanyard length indicia corresponding to at least one lanyard length value; wherein
   the first slider is moved to a first slider free fall distance calculation position based on a determined anchor height;
   the second slider is moved to a second slider free fall distance calculation position based on a determined lanyard length and a determined D-Ring height; and
   a determined free fall distance is determined based on a relative position of the free fall distance indexing arrow on the first slider and the free fall distance indicia on the second slider.

2. An apparatus as recited in claim 1, in which:
   an anchor height window is formed in the panel assembly;
   the first anchor height indicia comprises a plurality of anchor height values; and
   the first slider is moved into the first slider free fall distance calculation position by moving the first slider such that one of the plurality of anchor height values corresponding to the determined anchor height is within the anchor height window.

3. An apparatus as recited in claim 2, in which:
   the first D-Ring indicia comprises a plurality of D-Ring values; and
   the second slider is moved to the second slider free fall distance calculation position by moving the second slider such that one of the plurality of lanyard length values corresponding to the determined lanyard length is adjacent to one of the plurality of D-Ring values associated with the determined D-Ring height.

4. An apparatus as recited in claim 3, in which a lanyard length window is formed in the panel assembly, and the second slider is moved to the second slider free fall distance calculation position by moving the second slider such that one of the plurality of lanyard length values corresponding to the determined lanyard length is within lanyard length window.

5. An apparatus as recited in claim 2, in which:
   a main window is formed in the panel assembly;
   the free fall distance indicia correspond to a plurality of free fall distance values;
   the first slider is moved relative to the panel assembly by arranging the free fall distance indexing arrow within the main window; and
   the second slider is moved relative to the panel assembly by arranging the plurality of free fall distance values within the main window.

6. An apparatus as recited in claim 1, in which:
   the first D-Ring indicia comprises a plurality of D-Ring values; and
   the second slider is moved into to the second slider free fall distance calculation position by moving the second slider such that at least one lanyard length value corresponding to the determined lanyard length is adjacent to one of the plurality of D-Ring values associated with the determined D-Ring height.

7. An apparatus as recited in claim 6, in which a lanyard length window is formed in the panel assembly, and the second slider is moved to the second slider free fall distance calculation position by moving the second slider such that one of the plurality of lanyard length values corresponding to the determined lanyard length is within lanyard length window.

8. An apparatus as recited in claim 6, in which:
   a main window is formed in the panel assembly;
   the free fall distance indicia correspond to a plurality of free fall distance values;
   the first slider is moved relative to the panel assembly by arranging the free fall distance indexing arrow within the main window; and
   the second slider is moved relative to the panel assembly by arranging the plurality of free fall distance values are within the main window.

9. An apparatus as recited in claim 1, in which:
   a main window is formed in the panel assembly;
   the free fall distance indicia correspond to a plurality of free fall distance values;
   the first slider is moved relative to the panel assembly by arranging the free fall distance indexing arrow within the main window; and
   the second slider is moved relative to the panel assembly by arranging the plurality of free fall distance values within the main window.

10. An apparatus as recited in claim 1, in which:
    second D-Ring indicia corresponding to at least one D-Ring height are included on the panel assembly;
    shock absorber extension indicia corresponding to shock absorber extension are included on the first slider;
    a clearance required from the anchor indexing arrow is included on the first slider;
    clearance required from the anchor indicia corresponding to at least one clearance required from the anchor value are included on the second slider;
    second lanyard length indicia corresponding to lanyard length are included on the second slider;
    the first slider is moved to a first slider clearance required from the anchor calculation position based on a determined shock absorber extension;
    the second slider is moved to a second slider clearance required from the anchor calculation position relative to the panel assembly based on a determined lanyard length and a determined D-Ring height; and
    a determined clearance required from the anchor distance is determined based on a relative position of the clearance required from the anchor indexing arrow on the first slider and the clearance required from the anchor indicia on the second slider.

11. An apparatus for determining the safety of a working environment comprising:
a panel assembly including numerical indicia corresponding to D-Ring height;
a first slider supported for movement relative to the panel assembly, wherein the first slider includes
shock absorber extension indicia corresponding to shock absorber extension, and
a clearance required from the anchor indexing arrow;
a second slider supported for movement relative to the panel assembly, wherein the second slider includes
clearance required from the anchor indicia corresponding to at least one clearance required from the anchor value, and
lanyard length indicia corresponding to lanyard length; wherein
the first slider is moved to a first slide clearance required from the anchor calculation position based on a determined shock absorber extension;
the second slider is moved to a second slide clearance required from the anchor calculation position relative to the panel assembly based on a determined lanyard length and a determined D-Ring height; and
a determined clearance required from the anchor value is determined based on a relative position of the clearance required from the anchor indexing arrow on the first slider and the clearance required from the anchor indicia on the second slider.

* * * * *